(12) United States Patent
Tada et al.

(10) Patent No.: US 11,371,707 B2
(45) Date of Patent: Jun. 28, 2022

(54) COMBUSTOR AND GAS TURBINE INCLUDING THE SAME

(71) Applicant: Mitsubishi Power, Ltd., Yokohama (JP)

(72) Inventors: Katsuyoshi Tada, Tokyo (JP); Keijiro Saito, Tokyo (JP); Satoshi Tanimura, Yokohama (JP)

(73) Assignee: MITSUBISHI POWER, LTD., Kanagawa (JP)

(*) Notice: Subject to any disclaimer, the term of this patent is extended or adjusted under 35 U.S.C. 154(b) by 0 days.

(21) Appl. No.: 16/980,998

(22) PCT Filed: Jan. 24, 2019

(86) PCT No.: PCT/JP2019/002217
§ 371 (c)(1),
(2) Date: Sep. 15, 2020

(87) PCT Pub. No.: WO2019/187559
PCT Pub. Date: Oct. 3, 2019

(65) Prior Publication Data
US 2021/0088216 A1 Mar. 25, 2021

(30) Foreign Application Priority Data
Mar. 26, 2018 (JP) .............................. JP2018-058233

(51) Int. Cl.
*F23R 3/00* (2006.01)
*F23R 3/28* (2006.01)
(Continued)

(52) U.S. Cl.
CPC ............ *F23R 3/286* (2013.01); *F02C 7/22* (2013.01); *F05D 2240/35* (2013.01); *F23R 3/10* (2013.01)

(58) Field of Classification Search
CPC .... F23R 3/286; F23R 3/10; F23R 3/04; F23R 3/045; F23R 3/60; F02C 7/22; F05D 2240/35
See application file for complete search history.

(56) References Cited

U.S. PATENT DOCUMENTS 5,251,447 A * 10/1993 Joshi ..................... F23R 3/14
239/403
7,003,958 B2 2/2006 Dinu et al.
(Continued)

FOREIGN PATENT DOCUMENTS

| CN | 1715758 | 1/2006 |
| JP | 61-153404 | 7/1986 |

(Continued)

OTHER PUBLICATIONS

International Search Report dated Apr. 16, 2019 in International (PCT) Application No. PCT/JP2019/002217 with English-language translation.

(Continued)

*Primary Examiner* — Edwin Kang
(74) *Attorney, Agent, or Firm* — Wenderoth, Lind & Ponack, L.L.P.

(57) ABSTRACT

A combustor includes: a casing having an air chamber filled with air; at least one mixing passage forming member forming at least one mixing passage which is connected at an inlet side to the air chamber and at an outlet side to a combustion chamber and having an inlet at the inlet side of the at least one mixing passage so as to communicate with the air chamber; and at least one fuel nozzle disposed inside the air chamber and having a fuel injection hole, positioned upstream of the inlet of the at least one mixing passage forming member, for injecting fuel downstream.

3 Claims, 13 Drawing Sheets

(51) Int. Cl.
*F02C 7/22* (2006.01)
*F23R 3/10* (2006.01)

(56) References Cited

U.S. PATENT DOCUMENTS

| | | | |
|---|---|---|---|
| 8,104,284 B2 | 1/2012 | Miura et al. | |
| 8,424,311 B2 | 4/2013 | York et al. | |
| 8,539,773 B2 | 9/2013 | Ziminsky et al. | |
| 2002/0014078 A1* | 2/2002 | Mandai | F23R 3/286 60/737 |
| 2006/0000216 A1* | 1/2006 | Dinu | F23R 3/40 60/723 |
| 2008/0276618 A1 | 11/2008 | Poyyapakkam | |
| 2010/0192581 A1 | 8/2010 | Ziminsky et al. | |
| 2010/0218501 A1 | 9/2010 | York et al. | |
| 2010/0248171 A1 | 9/2010 | Hayashi et al. | |
| 2013/0219899 A1* | 8/2013 | Uhm | F23R 3/286 60/738 |
| 2013/0232979 A1* | 9/2013 | Singh | F23R 3/10 60/737 |
| 2014/0338339 A1 | 11/2014 | Westmoreland et al. | |
| 2016/0102863 A1 | 4/2016 | Yoshino | |

FOREIGN PATENT DOCUMENTS

| | | |
|---|---|---|
| JP | 2006-17381 | 1/2006 |
| JP | 2008-281329 | 11/2008 |
| JP | 2009-74706 | 4/2009 |
| JP | 2010-181137 | 8/2010 |
| JP | 2010-203758 | 9/2010 |
| JP | 2014-173837 | 9/2014 |
| JP | 2016-80214 | 5/2016 |

OTHER PUBLICATIONS

English translation of the International Preliminary Report on Patentability and Written Opinion of the International Searching Authority dated Oct. 8, 2020 in International Application No. PCT/JP2019/002217.

Office Action dated Jan. 28, 2022 in Chinese Application No. 201980019938.9.

* cited by examiner

COMBUSTOR AND GAS TURBINE INCLUDING THE SAME

TECHNICAL FIELD

The present invention relates to a combustor and a gas turbine including the same.

BACKGROUND

As a combustor for a gas turbine, for example, a combustor including a disk-shaped member having a plurality of fuel injection holes for injecting fuel is known. In this combustor, the fuel injection holes are formed so as to open in the central axis direction of the disk-shaped member, and the fuel injected through the fuel injection holes is combusted to generate flame in the central axis direction of the disk-shaped member.

One of such a combustor is disclosed in Patent Document 1. In the combustor disclosed in Patent Document 1, the fuel injection hole is connected to a mixing tube communicating with an air chamber (especially see FIG. 4). In the mixing tube, air supplied from the air chamber and fuel supplied from a fuel inlet formed on the tube wall of the mixing tube are mixed (especially see paragraph [0021]). Further, the air-fuel mixture in the mixing tube is injected through the outlet of the mixing tube and combusted in a combustion chamber (especially see paragraph [0021]).

CITATION LIST

Patent Literature

Patent Document 1: JP2010-203758A (especially, see paragraph [0021] and FIG. 4)

SUMMARY

Problems to be Solved

In the combustor disclosed in Patent Document 1, the fuel is mixed to the air flow in the mixing tube through the fuel inlet formed on the tube wall. Accordingly, it is difficult to spread the fuel evenly in the radial direction and the circumferential direction of the air flow. The fuel concentration is thus likely to be uneven in the radial direction and the circumferential direction inside the mixing tube. As a result, when the fuel is injected through the fuel injection holes and combusted in the combustion chamber, the generation amount of nitrogen oxide ($NO_X$) tends to increase due to a partially increased concentration of the fuel.

Further, when the fuel is supplied from the fuel inlet into the mixing tube, it is difficult to spread the fuel evenly in the radial direction as described above, so that the fuel concentration is likely to increase near the tube wall. Accordingly, when the fuel is injected through the fuel injection holes and combusted in the fuel chamber, flashback (backfire) is likely to occur due to a portion with high fuel concentration near the tube wall.

In view of the above, an object of at least one embodiment of the present invention is to provide a combustor and a gas turbine including the same whereby it is possible to sufficiently suppress flashback while reducing $NO_X$.

Solution to the Problems (1) A combustor according to an embodiment of the present invention comprises: a casing having an air chamber filled with air inside the casing; at least one mixing passage forming member in which at least one mixing passage connected at an inlet side to the air chamber and at an outlet side to a combustion chamber is formed, the at least one mixing passage forming member having an inlet formed at the inlet side of the at least one mixing passage so as to communicate with the air chamber; and at least one fuel nozzle disposed inside the air chamber, the at least one fuel nozzle having a fuel injection hole, positioned upstream of the inlet of the mixing passage forming member, for injecting fuel downstream.

With the above configuration (1), it is possible to sufficiently mix the fuel and the air in the mixing passage. When the air in the air chamber, which is a relatively wide space, passes through the relatively narrow inlet, a contraction flow occurs in the mixing passage. Meanwhile, the fuel is injected from the fuel injection hole positioned upstream of the inlet, and the injected fuel is introduced through the inlet together with the air. By the effect of the contraction flow generated in the mixing passage, the introduced fuel and air are sufficiently mixed in the mixing passage. As a result, it is possible to suppress the uneven fuel concentration in the mixing passage and reduce $NO_X$. Further, since the air enters upstream of the inlet of the mixing passage and downstream of the nozzle injection hole, it is possible to suppress flashback (backfire) due to high concentration of the fuel in the vicinity of the passage wall.

(2) In some embodiments, in the above configuration (1), the fuel injection hole is directed to the inlet when viewed from upstream to downstream along an axial direction of the casing.

With the above configuration (2), the fuel can easily flow into the inlet. As a result, the amount of the fuel scattered into the air chamber can be reduced, and flame control by fuel amount control can be facilitated.

(3) In some embodiments, in the above configuration (2), the at least one fuel nozzle includes a plurality of fuel nozzles having a first fuel nozzle and a second fuel nozzle adjacent to the first fuel nozzle, and the fuel injection hole of the first fuel nozzle and the fuel injection hole of the second fuel nozzle are directed to a common inlet when viewed from upstream to downstream along the axial direction of the casing.

With the above configuration (3), the fuel can be injected to the inlet through the plurality of fuel injection holes. Thus, it is possible to suppress the uneven fuel concentration in the radial direction and circumferential direction in the gas mixture flow in the mixing passage. As a result, it is possible to suppress the occurrence of uneven flame when the gas mixture is combusted in the combustion chamber.

(4) In some embodiments, in the above configuration (3), the at least one fuel nozzle includes a plurality of fuel nozzles, and the fuel injection holes of the plurality of fuel nozzles are directed to a common inlet when viewed from upstream to downstream along the axial direction of the casing, and the fuel injection holes are arranged at even intervals in a circumferential direction of the common inlet.

With the above configuration (4), since the fuel can be injected at even intervals in the circumferential direction, it is possible to more sufficiently suppress the uneven fuel concentration in the circumferential direction.

(5) In some embodiments, in any one of the above configurations (1) to (4), the casing has a fuel chamber for storing the fuel inside the casing, the fuel chamber being formed between the air chamber inside the casing and the combustion chamber.

With the above configuration (5), the fuel passage can be formed so as to avoid the air chamber, and the interior space of the air chamber can be sufficiently ensured. When the interior space of the air chamber is sufficiently ensured, the air is likely to evenly flow from the air chamber to the inlet regardless of the position of the mixing passage forming member. As a result, it is possible to sufficiently reduce the unevenness of the air inflow amount among the mixing passages.

(6) In some embodiments, in the above configuration (5), the combustor further comprises a porous plate separating the air chamber from the fuel chamber, the porous plate having a first opening connecting the air chamber and the fuel chamber and a second opening connecting the air chamber and the mixing passage. The fuel nozzle is formed in a bottomed cylindrical shape with a closed end and an open end, and the open end of the fuel nozzle is connected to the first opening of the porous plate.

With the above configuration (6), it is possible to supply the fuel inside the fuel chamber to the inlet of the mixing passage through the first opening of the porous plate with a simple structure.

(7) In some embodiments, in any one of the above configurations (1) to (4), the fuel nozzle is formed in a bottomed cylindrical shape with an end connected to a fuel supply source which is a supply source of the fuel and a closed end facing the inlet.

With the above configuration (7), the length of each fuel nozzle can be changed individually. Thus, the length of the mixing passage can be changed in accordance with the length of the fuel nozzle. As a result, it is possible to suppress resonance and damp combustion vibration of the combustor.

(8) In some embodiments, in the above configuration (7), the at least one mixing passage includes a plurality of mixing passages, and the at least one mixing passage forming member includes a plurality of mixing tubes arranged at intervals and forming each of the plurality of mixing passages.

With the above configuration (8), the air can be introduced to the inlet of the mixing tube through a gap between the mixing tubes. Thus, the air can be supplied to the mixing tube from both upstream and downstream of the inlet, so that the contraction flow effect is improved. As a result, it is possible to more sufficiently mix the fuel and the air in the mixing passage.

(9) In some embodiments, in the above configuration (7), the at least one mixing passage includes a plurality of mixing passages, and the at least one mixing passage forming member includes a partition wall assembly composed of a plurality of partition walls separating each of the plurality of mixing passages.

With the above configuration (9)), when a failure occurs in the mixing passage, the failure can be eliminated by replacing the entire partition wall assembly, so that the maintenance is facilitated. Further, since the mixing passages are separated by the partition wall, there is no wasted space, and the combustor can be downsized. Further, since the mixing passages are densely formed, the fuel can be supplied to many mixing passages by one fuel nozzle. As a result, it is possible to reduce the number of fuel nozzles. Furthermore, it is possible to cause mixing close to a jet flow that receives a side wind, enabling particularly sufficient mixing.

(10) A gas turbine according to at least one embodiment of the present invention comprises: the combustor described in any one of the above (1) to (9); a compressor for compressing the air to be supplied to the combustor; and a turbine configured to be driven by a combustion gas discharged from the combustion chamber of the combustor.

With the above configuration (10), it is possible to provide the gas turbine that can stably operate by combusting the gas mixture sufficiently mixed as described above.

Advantageous Effects

At least one embodiment of the present invention provides a combustor and a gas turbine including the same whereby it is possible to sufficiently suppress flashback while reducing $NO_X$.

DETAILED DESCRIPTION

Figure 1:
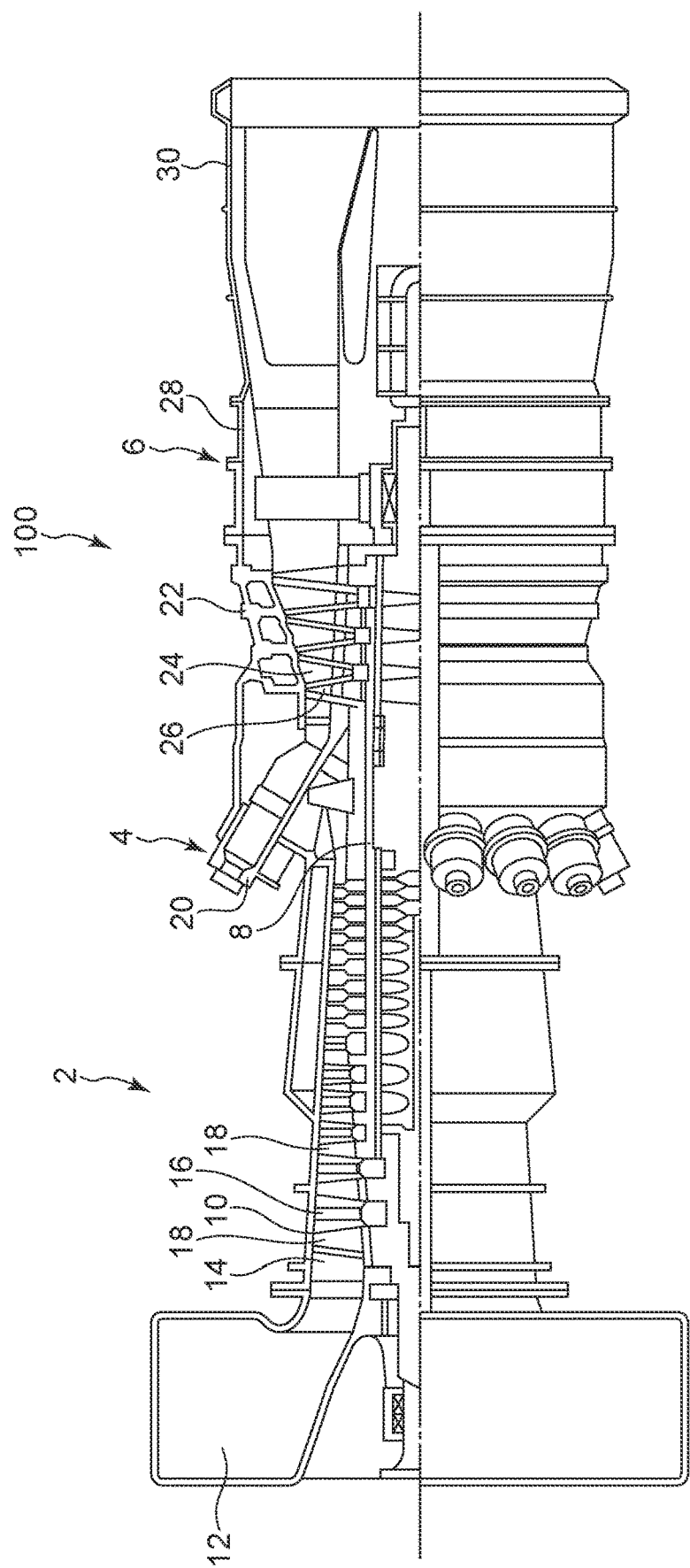
FIG. 1 is a configuration diagram of a gas turbine according to a first embodiment of the present invention.

Embodiments of the present invention will now be described in detail with reference to the accompanying drawings. However, the following embodiments and the drawings are illustrative only, and various modifications may be applied as long as they do not depart from the object of the present invention. Further, two or more embodiments may be optionally combined in any manner. Further, in the following embodiments, similar elements will be indicated by the same reference numerals, and redundant descriptions thereof will be omitted.

It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

FIG. 1 is a schematic configuration diagram of a gas turbine 100 according to an embodiment of the present invention. As shown in FIG. 1, the gas turbine 100 according to an embodiment includes a compressor 2 for compressing air (i.e., producing compressed air) that serves as an oxidant supplied to a combustor 4, the combustor 4 (gas turbine combustor) for producing combustion gas using the compressed air and fuel, and a turbine 6 configured to be driven by the combustion gas discharged from a combustion chamber 124 (described later) of the combustor 4. In the case of the gas turbine 100 for power generation, a generator (not shown) is connected to the turbine 6, so that rotational energy of the turbine 6 generates electric power.

In the combustor 4 of the gas turbine 100, a gas mixture of fuel and air is combusted to generate the combustion gas. In the combustor 4, fuel and air can be mixed sufficiently, as described in detail later. Accordingly, in the gas turbine 100 including the combustor 4, by combusting the gas sufficiently mixed, it is possible to stably operate the gas turbine 100 while suppressing $NO_X$.

Examples of the fuel combusted in the combustor 4 include hydrogen, methane, light oil, heavy oil, jet fuel, natural gas, and gasified coal, and one or more of them may be combined in any combination for combustion.

The compressor 2 includes a compressor casing 10, an air inlet 12 disposed on an inlet side of the compressor casing 10 for sucking in air, a rotor 8 disposed so as to penetrate through both of the compressor casing 10 and a turbine casing 22, and a variety of blades disposed in the compressor casing 10. The variety of blades includes an inlet guide vane 14 disposed adjacent to the air inlet 12, a plurality of stator vanes 16 fixed to the compressor casing 10, and a plurality of rotor blades 18 implanted on the rotor 8 so as to be arranged alternately with the stator vanes 16. In the compressor 2, the air sucked in from the air inlet 12 flows through the plurality of stator vanes 16 and the plurality of rotor blades 18 to be compressed into compressed air having a high temperature and a high pressure. The compressed air having a high temperature and a high pressure is sent to the combustor 4 of a latter stage from the compressor 2.

The combustor 4 is provided with a casing 20. Although FIG. 1 depicts only one combustor, a plurality of combustors 4 may be disposed in an annular shape centered at the rotor 8 inside a gas turbine casing not depicted (the gas turbine casing may be a part or entirety of the casing 20). The combustor 4 is supplied with fuel and the compressed air produced in the compressor 2, and combusts the fuel to produce combustion gas that serves as a working fluid of the turbine 6. The combustion gas is sent to the turbine 6 at a latter stage from the combustor 4.

The turbine 6 includes a turbine casing 22 and a variety of blades disposed inside the turbine casing 22. The variety of blades includes a plurality of stator vanes 24 fixed to the turbine casing 22 and a plurality of rotor blades 26 implanted on the rotor 8 so as to be arranged alternately with the stator vanes 24. In the turbine 6, the rotor 8 is driven to rotate as the combustion gas passes through the plurality of stator vanes 24 and the plurality of rotor blades 26. In this way, the generator (not shown) connected to the rotor 8 is driven.

Further, an exhaust chamber 30 is connected to the downstream side of the turbine casing 22 via an exhaust casing 28. The combustion gas having driven the turbine 6 is discharged outside through the exhaust casing 28 and the exhaust chamber 30.

Figure 2:
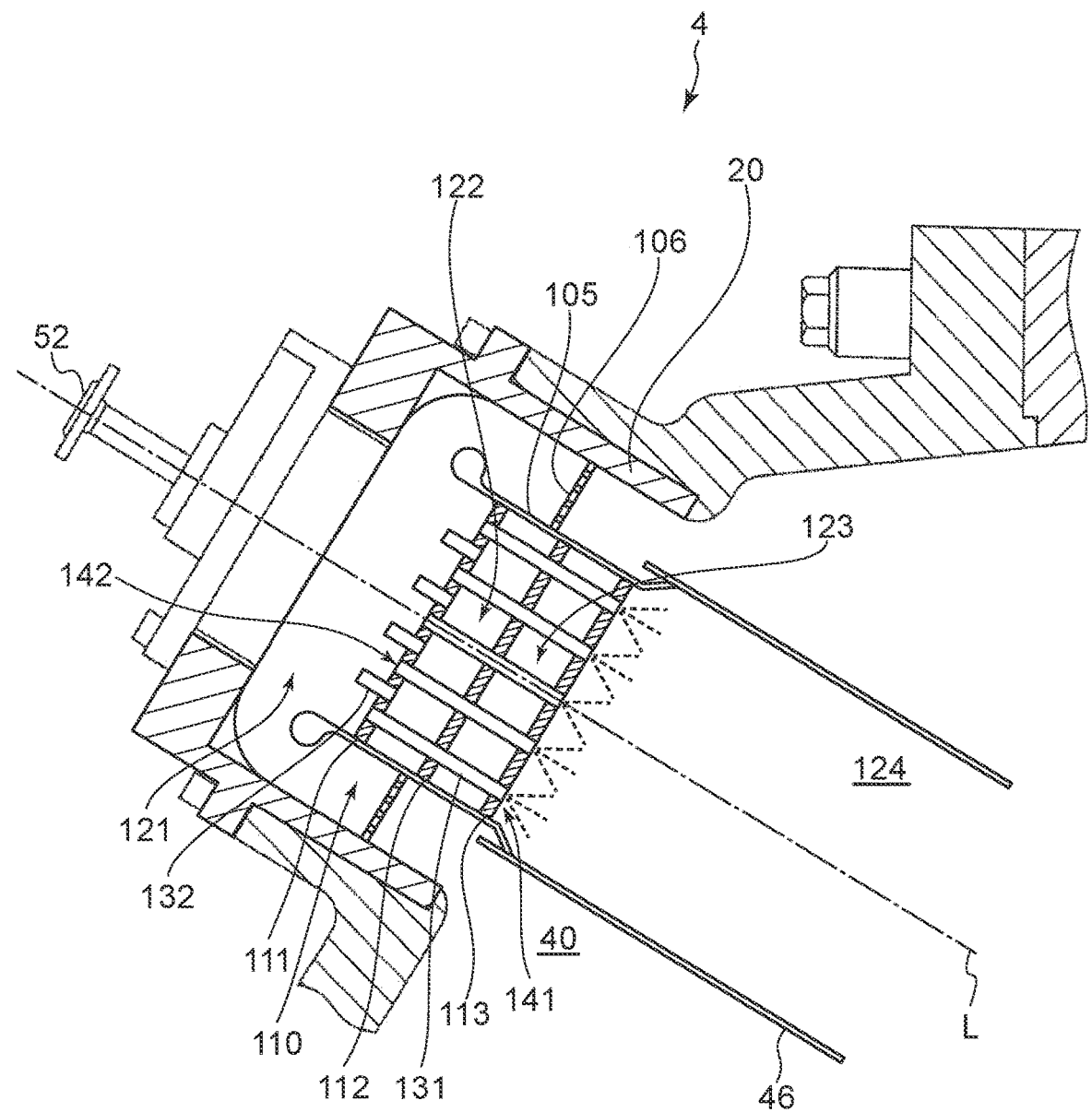
FIG. 2 is a cross-sectional view of the vicinity of a combustor.

FIG. 2 is a cross-sectional view of the vicinity of the combustor 4. In FIG. 2, the dash-dotted line indicates the axis L of the casing 20. Further, in FIG. 2, the number of mixing passage forming members 131 is less than that in the embodiment shown in FIG. 3 for convenience of illustration.

The combustor 4 is provided with the casing 20, as described above. In the casing 20, a cylindrical member 105 is disposed. The cylindrical member 105 is fixed within the casing 20 by support members 106 disposed on the outer circumferential wall of the cylindrical member 105 at even intervals. The support members 106 are spaced from each other in the circumferential direction. Further, in the casing 20, an air chamber 121 filled with the air (compressed air) flowing from a compartment 40 through an air passage 110 is formed on the back side of the cylindrical member 105.

In the cylindrical member 105, a first support plate 111, a second support plate 112, and a third support plate 113 are disposed at intervals. Between the first support plate 111 and the second support plate 112, a fuel chamber 122 for storing the fuel for the gas mixture to be injected through gas mixture injection holes 141 is formed. That is, the casing 20 includes the fuel chamber 122 for storing the fuel between the air chamber 121 formed inside the casing 20 and the combustion chamber 124 formed inside a combustion liner 46. The supply of the fuel from the fuel chamber 122 to the gas mixture injection holes 141 will be described later. The fuel chamber 122 is connected to a fuel passage (not shown) communicating with a fuel port 52. Thus, the fuel chamber 122 is supplied with the fuel through the fuel port 52 and the fuel passage.

When the fuel chamber 122 is formed at the above-described position, the fuel passage can be formed so as to avoid the air chamber 121, and the interior space of the air chamber 121 can be sufficiently ensured. More specifically, for instance, the fuel passage communicating with the fuel port 52 may pass outside the air passage and cross the air passage 110 in the middle of the air passage 110 to be connected to the fuel chamber 122. The support member 106 may serve as the fuel passage. When the interior space of the air chamber 121 is sufficiently ensured, the air is likely to evenly flow from the air chamber 121 to an inlet 142 regardless of the position of the mixing passage forming member 131. As a result, it is possible to sufficiently reduce the unevenness of the air inflow amount among the mixing passages 134.

Between the second support plate 112 and the third support plate 113, a cooling air chamber 123 is formed. The combustion chamber 124 is formed on the front side of the third support plate 113, as described in detail later. Accordingly, due to combustion of the fuel in the combustion chamber 124, the third support plate 113 is heated. To cool the third support plate 113, the cooling air is supplied to the cooling air chamber 123 formed on the opposite side from the combustion chamber 124. The cooling air is supplied to the cooling air chamber 123 through a cooling air supply system (not shown). Further, the cooling air that has been used for cooling the third support plate 113 is discharged to, for example, the combustion chamber 124 through an exhaust passage (not shown).

The first support plate 111, the second support plate 112, and the third support plate 113 are each formed in a disk shape so as to be fitted in the cylindrical member 105 of cylindrical shape. The first support plate 111, the second support plate 112, and the third support plate 113 are arranged such that they are perpendicular to the axis L of the casing 20 and the axis L passes through the center points thereof (not shown).

The first support plate 111, the second support plate 112, and the third support plate 113 have through holes (not shown). By inserting the tubular mixing passage forming member 131 into the through holes, the mixing passage forming member 131 is supported by the first support plate 111, the second support plate 112, and the third support plate 113.

The mixing passage forming member 131 is, for example, embodied as a mixing tube formed in a tubular shape and made of metal. Thus, one mixing passage 134 is formed in one mixing passage forming member 131. When the combustor 4 includes a plurality of mixing passage forming members 131 (although it may include one), a plurality of mixing passages 134 are formed. That is, the mixing passage forming member 131 is embodied as a plurality of mixing tubes forming the plurality of mixing passages 134 respectively. In the combustor 4, the mixing tubes (mixing passage forming members 131) are arranged at intervals.

The mixing passage forming member 131 has the mixing passage 134 (see FIG. 5) for mixing the fuel and the air introduced therein. The mixing passage 134 is connected at the inlet side (back side) to the air chamber 121 and at the outlet side (front side) to the combustion chamber 124. The casing 20 contains at least one mixing passage forming member 131 along the axis L of the casing 20.

At the inlet side of the mixing passage 134, an inlet 142 communicating with the air chamber 121 is formed, and the fuel and the air are introduced through the inlet 142. The introduced fuel and air are sufficiently mixed in the mixing passage 134 to produce the gas mixture. The gas mixture is injected to the combustion chamber 124 through the gas mixture injection hole 141 formed at the outlet side of the mixing passage 134.

Figure 3:
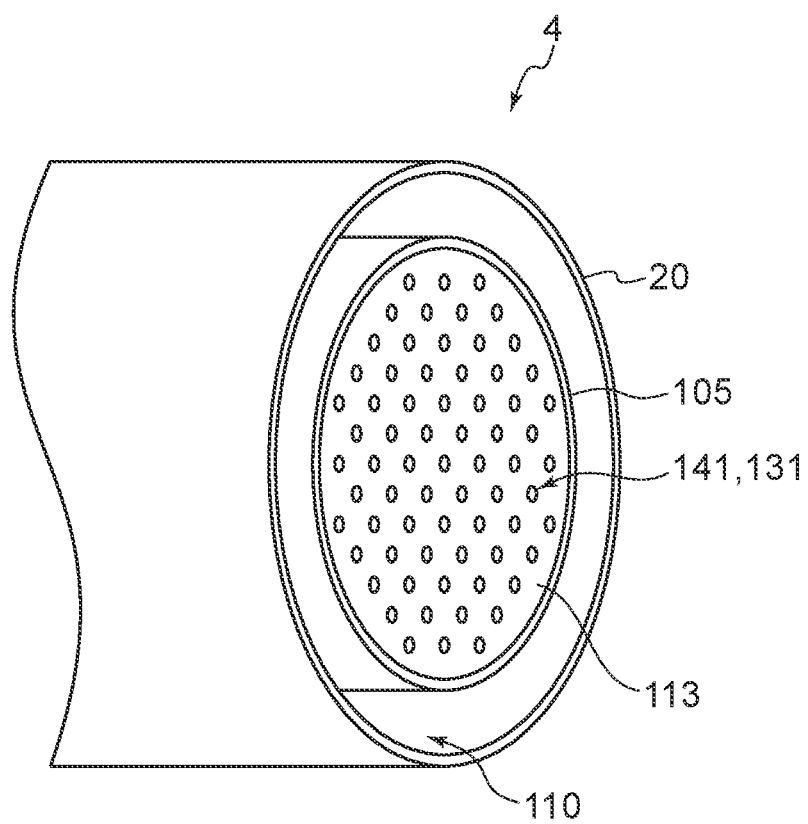
FIG. 3 is an enlarged perspective view of the vicinity of fuel injection holes of a combustor.
Figure 3:
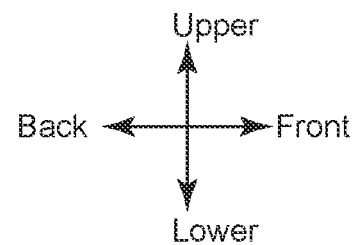

FIG. 3 is an enlarged perspective view of the vicinity of the gas mixture injection holes 141 of the combustor 4. As described with reference to FIG. 2, in the cylindrical member 105, the disk-shaped third support plate 113 is disposed at a front part of the cylindrical member 105. The third support plate 113 supports the mixing passage forming members 131 composed of the mixing tubes. At the outlet side of the mixing passage 134 in the mixing passage forming member 131, at least one gas mixture injection hole 141 is formed. The gas mixture injection hole 141 communicates with the combustion chamber 124 (not shown in FIG. 3). Thus, the fuel injected through the gas mixture injection hole 141 is ignited by an ignition source (not shown) and combusted in the combustion chamber 124.

The air passage 110 connecting the compartment 40 (see FIG. 2) and the air chamber 121 (see FIG. 2) is formed inside the casing 20 and outside the cylindrical member 105. On the front side of the cylindrical member 105, as shown in FIG. 2, the combustion liner 46 (see FIG. 2) is disposed. Accordingly, the compartment 40 and the air passage 110 are separated by the combustion liner 46 from the combustion chamber 124 communicating with the gas mixture injection hole 141.

Referring to FIG. 2 again, the first support plate 111 is composed of a porous plate separating the air chamber 121 and the fuel chamber 122. The porous plate constituting the first support plate 111 has a first opening 111a (not shown in FIG. 2, see FIG. 5) connecting the air chamber 121 and the fuel chamber 122, and the inlet 142 (second opening) connecting the air chamber 121 and the mixing passage 134. The air chamber 121 and the fuel chamber 122 are communicated through, in addition to the first opening 111a, a nozzle injection hole 133 of a fuel nozzle 132 described later.

To the back side of the first support plate 111, a fuel nozzle 132 made of, for example, metal is connected. Accordingly, the fuel nozzle 132 is disposed inside the air chamber 121, which is disposed on the back side of the first support plate 111. The combustor includes at least one fuel nozzle 132. The fuel nozzle 132 has a nozzle injection hole 133 (fuel injection hole) positioned upstream of the inlet 142 of the mixing passage forming member 131 for injecting the fuel downstream. The fuel nozzle 132 will now be described with reference to FIG. 4.

Figure 4:
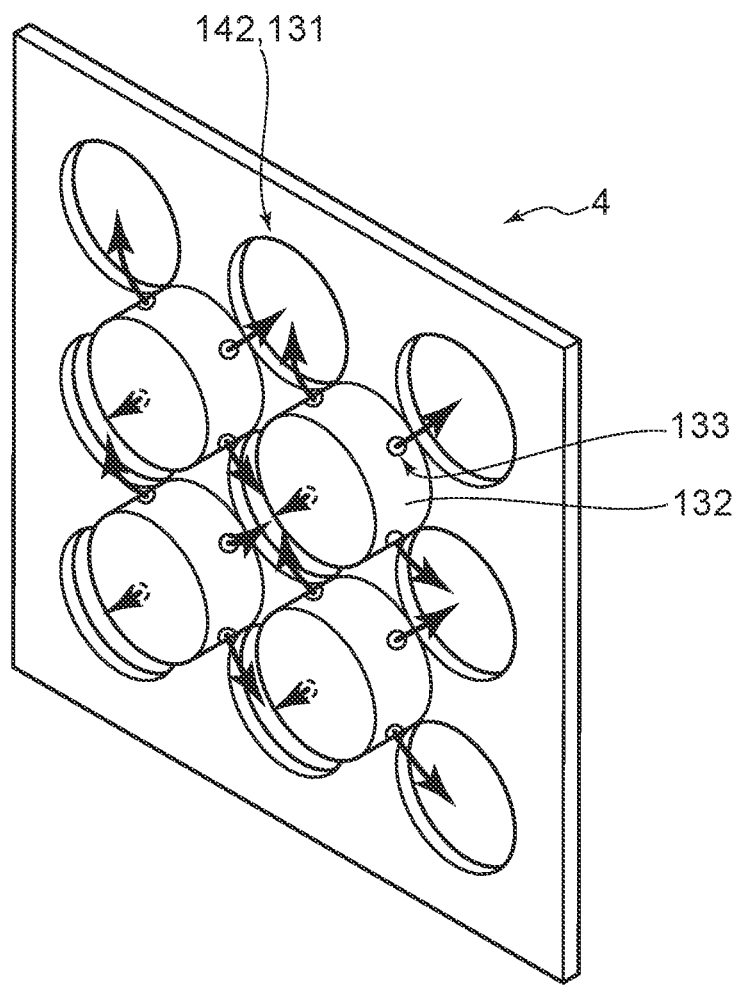
FIG. 4 is an enlarged perspective view of the vicinity of fuel nozzles of a combustor.
Figure 4:
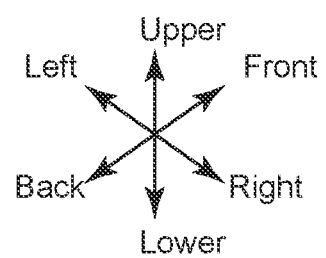

FIG. 4 is an enlarged perspective view of the vicinity of the fuel nozzles 132 of the combustor 4. In FIG. 4, some of the fuel nozzles 132 of the combustor 4 are depicted. The solid arrow shown in FIG. 4 indicates the flow of the fuel injected from the nozzle injection hole 133.

The at least one fuel nozzle 132 is formed in a bottomed cylindrical shape with a closed (back side) end and an open (front side) end. The open end of the fuel nozzle 132 is connected to the first opening 111a (not shown in FIG. 4, see FIG. 5) of the porous plate constituting the first support plate 111. Accordingly, the interior of the fuel nozzle 132 communicates with the fuel chamber 122. As a result, it is possible to supply the fuel inside the fuel chamber 122 to the inlet 142 of the mixing passage 134 through the first opening 111a of the porous plate with a simple structure.

On the side surface of the fuel nozzle 132, the nozzle injection hole 133 communicating with the air chamber 121 (see FIG. 2, not shown in FIG. 4) is formed. The nozzle injection hole 133 serves to inject the fuel in the fuel chamber 122 to the inlet 142 of the mixing passage forming member 131 supported by the first support plate 111. When the fuel is injected from the nozzle injection hole 133, the injected fuel reaches the inlet 142 as shown by the solid arrow in FIG. 4. Further, the inlet 142 communicates with the air chamber 121 (not shown in FIG. 4). Thus, the air in the air chamber 121 also reaches the inlet 142.

As described above, when both the fuel and the air flows into the mixing passage forming member 131 through the inlet 142, the fuel and the air are mixed in the mixing passage 134 formed therein to produce the gas mixture. The gas mixture thus produced is injected to the combustion chamber 124 through the gas mixture injection hole 141 formed at the downstream side of the mixing passage 134 and combusted.

Figure 5:
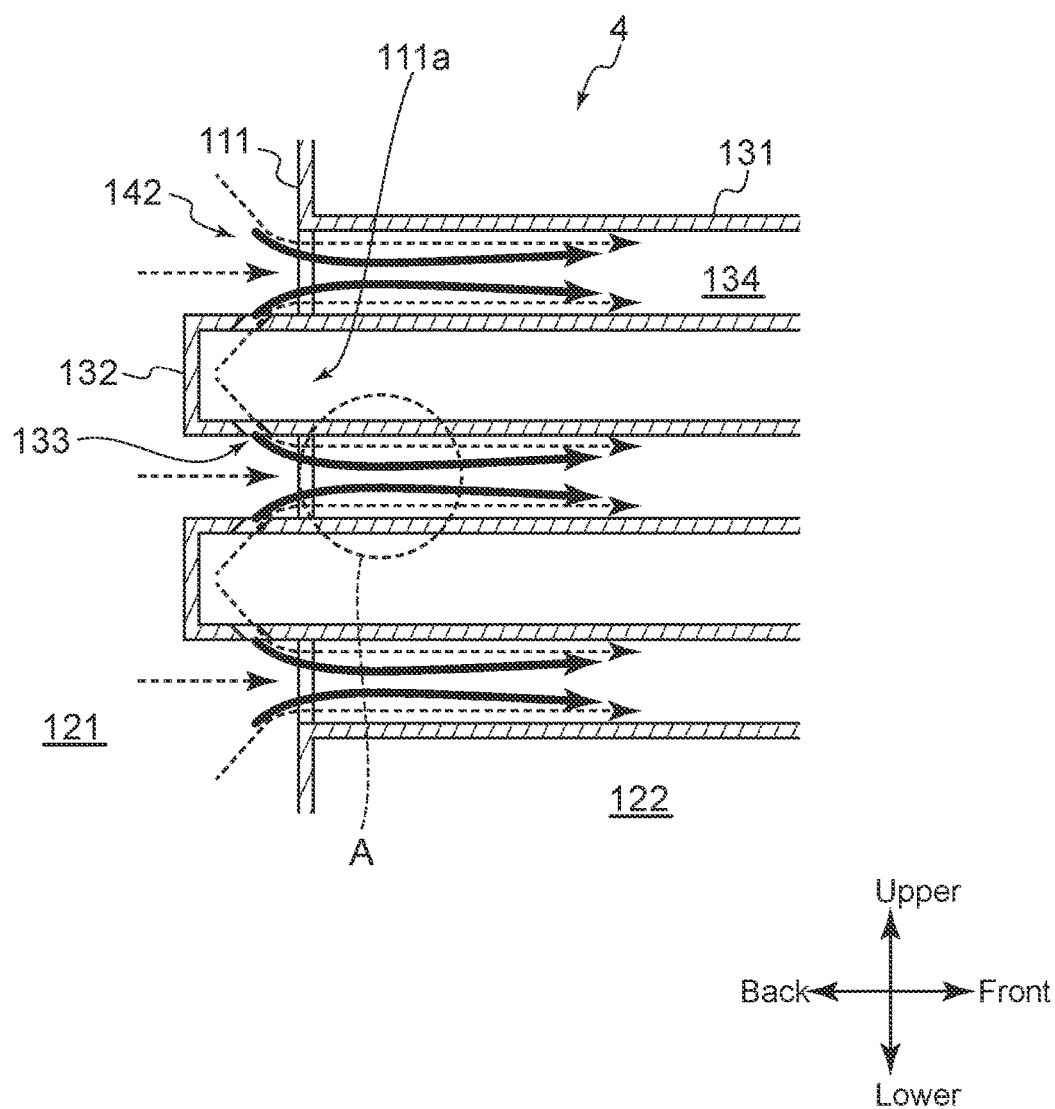
FIG. 5 is a diagram showing the flow of fuel and air entering inlets.

FIG. 5 is a diagram showing the flow of the fuel (solid arrow) and the air (dotted arrow) entering the inlets 142. In FIG. 5, the air flow indicated by the dotted arrow inside the fuel nozzle 132 is actually the air flow flowing around the fuel nozzle 132, but is illustrated as passing inside the fuel nozzle 132 for convenience of illustration.

As described above, the fuel entering the inlet 142 is the fuel that has been injected through the nozzle injection hole 133 positioned on the upstream side (back side) of the inlet 142. Meanwhile, the air entering the inlet 142 is the air filled in the air chamber 121 in which the inlet 142 is formed. That is, the air enters the inlet 142 from the interior of the air chamber 121 having a much larger space than the inlet 142. Accordingly, the air enters the inlet 142 from various directions around the inlet 142.

More specifically, for example, as shown by the dotted line in FIG. 5, on one hand, the air flows linearly from the upstream side (back side) of the nozzle injection hole 133 of the fuel nozzle 132 to the inlet 142, and on the other hand, the air flows curvedly from the upper and lower directions to the inlet 142 in a region between the nozzle injection hole 133 and the inlet 142. Accordingly, the air flows into the mixing passage 134 from various directions. As a result, a contraction flow occurs in the portion A near the inlet 142 of the mixing passage 134. This contraction flow enables the fuel introduced as shown by the solid arrow in FIG. 5 to be sufficiently mixed with the air introduced as shown by the dotted line in FIG. 5.

That is, as described above, when the air in the air chamber 121, which is a relatively wide space, passes through the relatively narrow inlet 142, a contraction flow occurs in the mixing passage 134. Meanwhile, the fuel is injected from the nozzle injection hole 133 (fuel injection hole) positioned upstream of the inlet 142, and the injected fuel is introduced through the inlet 142 together with the air. By the effect of the contraction flow generated in the mixing passage 134, the introduced fuel and air are sufficiently mixed in the mixing passage 134. As a result, it is possible to suppress the uneven fuel concentration in the mixing passage 134 and reduce $NO_X$. Further, since the air enters upstream of the inlet 142 of the mixing passage 134 and downstream of the nozzle injection hole 133, it is possible to suppress flashback (backfire) due to high concentration of the fuel in the vicinity of the passage wall.

Figure 6:
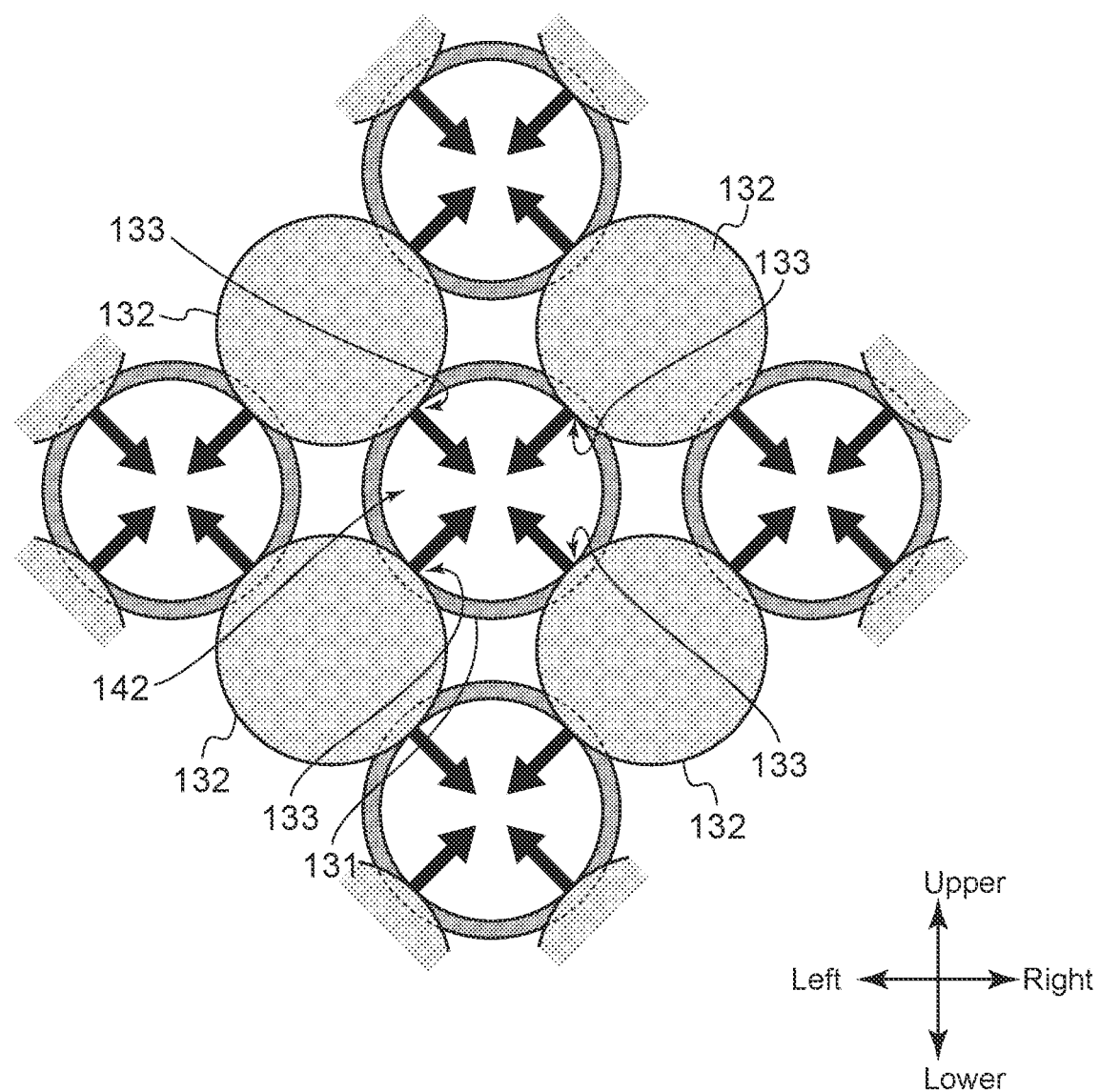
FIG. 6 is a diagram showing the arrangement of fuel nozzles and mixing passage forming members.

FIG. 6 is a diagram showing the arrangement of the fuel nozzles 132 and the mixing passage forming members 131. This figure shows the state viewed from upstream to downstream (i.e., from back side to front side) along the direction of the axis L (see FIG. 2) of the casing 20. However, in FIG. 6, the first support plate 111 is not depicted for convenience of illustration.

As shown in FIG. 6, each of the nozzle injection holes 133 formed on the side surfaces of the fuel nozzles 132 is directed to the inlet 142. As described above, the inlet 142 is disposed in the air chamber 121, and the air chamber 121 is supplied with the air from the compartment 40. Then, the air flows from the air chamber 121 to the inlet 142. Therefore, by injecting the fuel so as to be directed to the inlet 142 when viewed as described above, the fuel easily flows to the inlet 142. As a result, the amount of the fuel scattered into the air chamber 121 can be reduced, and flame control by fuel amount control can be facilitated.

Further, as shown in FIG. 6, in the combustor 4 according to an embodiment of the present invention, a plurality of fuel nozzles 132 are disposed around one mixing passage forming member 131. More specifically, the fuel nozzle 132 includes a plurality of fuel nozzles 132 including one fuel nozzle 132 (first fuel nozzle) and another fuel nozzle 132 (second fuel nozzle) disposed adjacent to the one fuel nozzle 132. Further, the nozzle injection hole 133 of the fuel nozzle 132 (first fuel nozzle) and the nozzle injection hole 133 of the adjacent fuel nozzle 132 (second fuel nozzle) are directed to a common inlet 142 when viewed as described above.

With this configuration, the fuel is injected through the plurality of nozzle injection holes 133 (fuel injection holes) to the inlet 142. Thus, it is possible to suppress the uneven fuel concentration in the radial direction and circumferential direction in the gas mixture flow in the mixing passage 134. As a result, it is possible to suppress the occurrence of uneven flame when the gas mixture is combusted in the combustion chamber 124.

As described above, the nozzle injection holes 133 of the plurality of fuel nozzles 132 are directed to a common inlet 142 when viewed as described above. Further, the respective nozzle injection holes 133 are arranged at even intervals in the circumferential direction of one inlet 142. Specifically, in the example shown in FIG. 6, four nozzle injection holes 133 are arranged at even intervals in the circumferential direction around one inlet 142. With this configuration, since the fuel can be injected at even intervals in the circumferential direction, it is possible to more sufficiently suppress the uneven fuel concentration in the circumferential direction.

Further, as shown in FIG. 6, when the fuel nozzles 132 and the mixing passage forming members 131 are alternately arranged in a square lattice shape, the fuel can be injected to four mixing passage forming members 131 by one fuel nozzle 132. More specifically, the axes of the fuel nozzles 132 and the axes of the mixing passage forming members 131 are alternately located at the centers of the intersections that form the square lattice when viewed as described above. With this configuration, since the gas mixture injection holes 141 are arranged at even intervals, it is possible to suppress the occurrence of uneven flame when the gas mixture is combusted in the combustion chamber 124.

Figure 7:
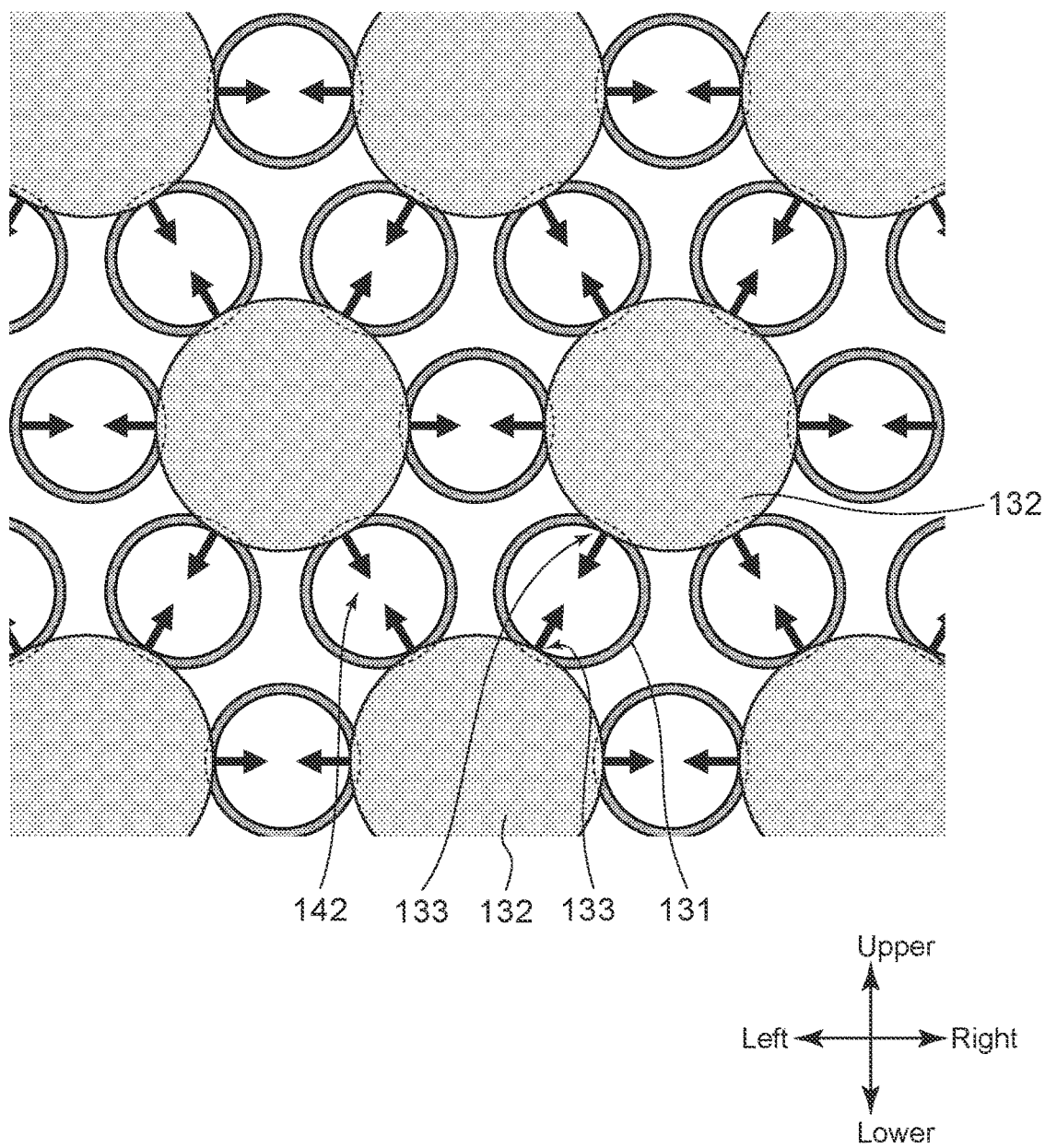
FIG. 7 is a diagram showing the arrangement of fuel nozzles and mixing passage forming members according to an embodiment different from FIG. 6.

FIG. 7 is a diagram showing the arrangement of the fuel nozzles 132 and the mixing passage forming members 131 according to an embodiment different from FIG. 6. FIG. 7 also shows the state viewed from upstream to downstream (i.e., from back side to front side) along the direction of the axis L (see FIG. 2) of the casing 20, as with FIG. 6.

In the arrangement shown in FIG. 7, the fuel nozzles 132 and the mixing passage forming members 131 are arranged in a close-packed lattice shape. That is, six mixing passage forming members 131 are arranged at even intervals around one fuel nozzle 132. In other words, when viewed as described above, the axes of the six mixing passage forming members 131 are in a close-packed lattice shape around the axis of one fuel nozzle 132. Thus, the fuel can be injected to six mixing passage forming members 131 by one fuel nozzle 132. As a result, since the fuel can be injected at even intervals in the circumferential direction, it is possible to more sufficiently suppress the uneven fuel concentration in the circumferential direction. Further, it is possible to reduce the number of the fuel nozzles 132 smaller than the number of the mixing passage forming members 131.

Figure 8:
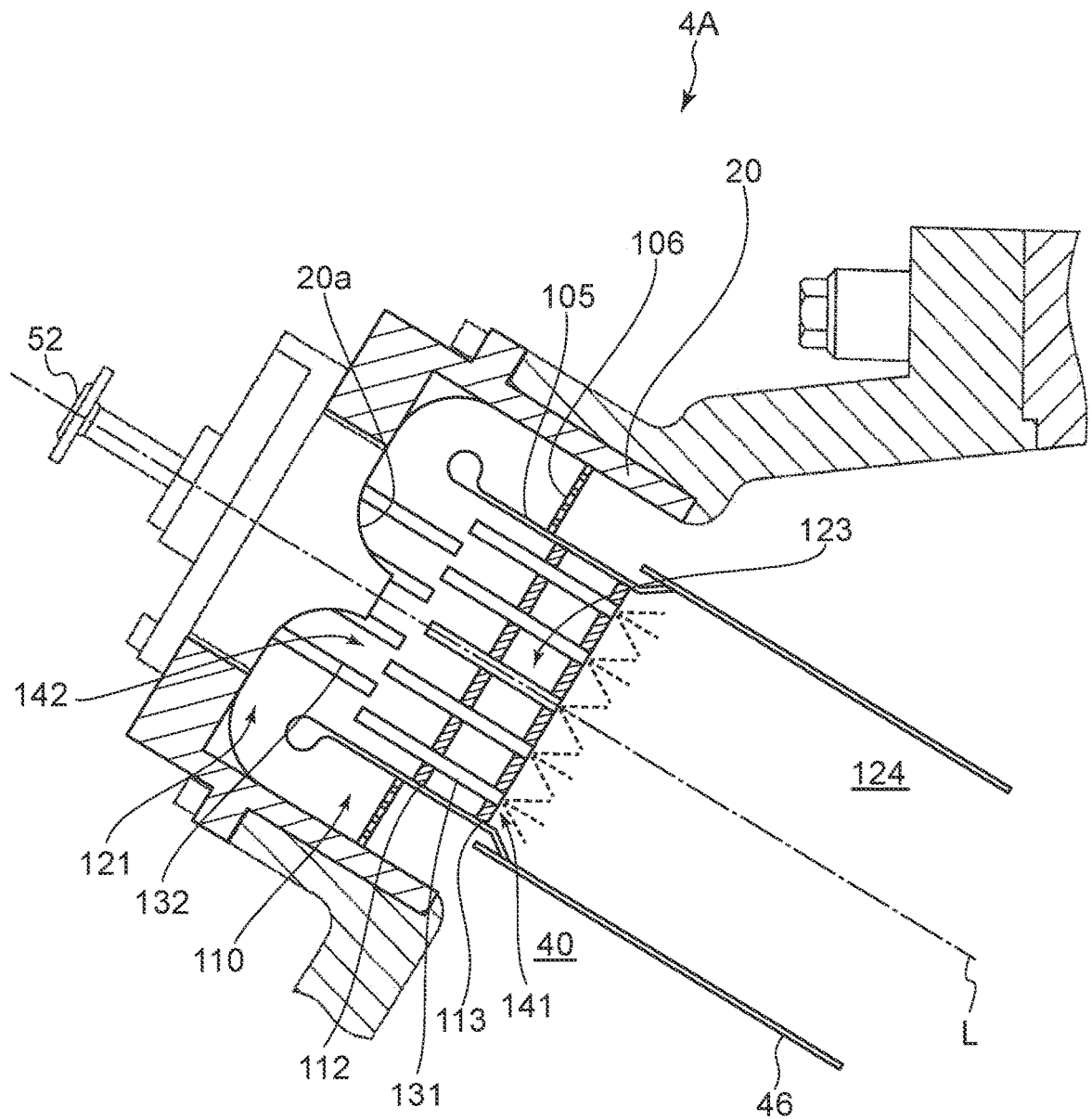
FIG. 8 is a cross-sectional view of the vicinity of a combustor according to a second embodiment of the present invention.
Figure 8:
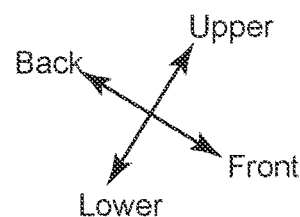

FIG. 8 is a cross-sectional view of the vicinity of a combustor 4A according to a second embodiment of the present invention. In the combustor 4 (see FIG. 2), the fuel chamber 122 is formed between the first support plate 111 and the second support plate 112. Further, the fuel nozzle 132 having the nozzle injection hole 133 communicating with the fuel chamber 122 is disposed on the back side of the first support plate 111 separating the fuel chamber 122. However, in the combustor 4A shown in FIG. 8, the fuel chamber 122 is not provided, and the fuel nozzle 132 extends from a back-side inner wall 20a of the casing 20 so as to cross the air chamber 121. The fuel nozzle 132 is connected to a fuel supply source (not shown) which is a supply source of the fuel combusted in the combustion chamber 124 via a fuel port 52.

The fuel nozzle 132 is connected at one end to the fuel supply source. The other end faces the inlet 142 of the mixing passage forming member 131. Further, the other end of the fuel nozzle 132 is closed so as to form a bottomed cylindrical shape. The side surface of the other end of the fuel nozzle 132 has the nozzle injection hole 133 for injecting the fuel to be introduced into the inlet 142. In the fuel nozzle 132 shown in FIG. 8, four nozzle injection holes 133 are formed at even intervals in the circumferential direction as with the fuel nozzle 132 of the combustor 4.

With such a fuel nozzle 132, the length of each fuel nozzle 132 can be changed individually. Thus, the length of the mixing passage 134 can be changed in accordance with the length of the fuel nozzle 132. As a result, it is possible to suppress resonance and damp combustion vibration of the combustor 4A.

Further, the back-side inner wall 20a of the casing 20 of the combustor 4A is composed of a curved surface curved frontward along the axis L of the casing 20, unlike the combustor 4 with a plane surface. Specifically, the back-side inner wall 20a is composed of a curved surface that projects frontward (inward of the casing 20) around the center.

When the back-side inner wall 20a is formed in this way, it is possible to prevent the air introduced into the air chamber 121 from one of the upper and lower air passages 110 from escaping to the other air passage 110. Thus, approximately the same amount of the air can be fed to each inlet 142, from the inlet 142 closest to the air passage 110 to the inlet 142 at the center. As a result, it is possible to reduce the uneven mixing in each mixing passage 134.

Additionally, in the combustor 4A, the mixing passage forming members 131 (mixing tube) protrude into the air chamber 121. Further, a gap is formed between the mixing passage forming members 131. With the mixing passage forming members 131 having this configuration, the air can be introduced to the inlet 142 of the mixing passage forming member 131 through the gap between the mixing passage forming members 131. Thus, the air can be supplied to the mixing passage forming member 131 from both upstream and downstream of the inlet 142, so that the above contraction flow effect is improved. As a result, it is possible to more sufficiently mix the fuel and the air inside the mixing passage forming member 131.

Figure 9:
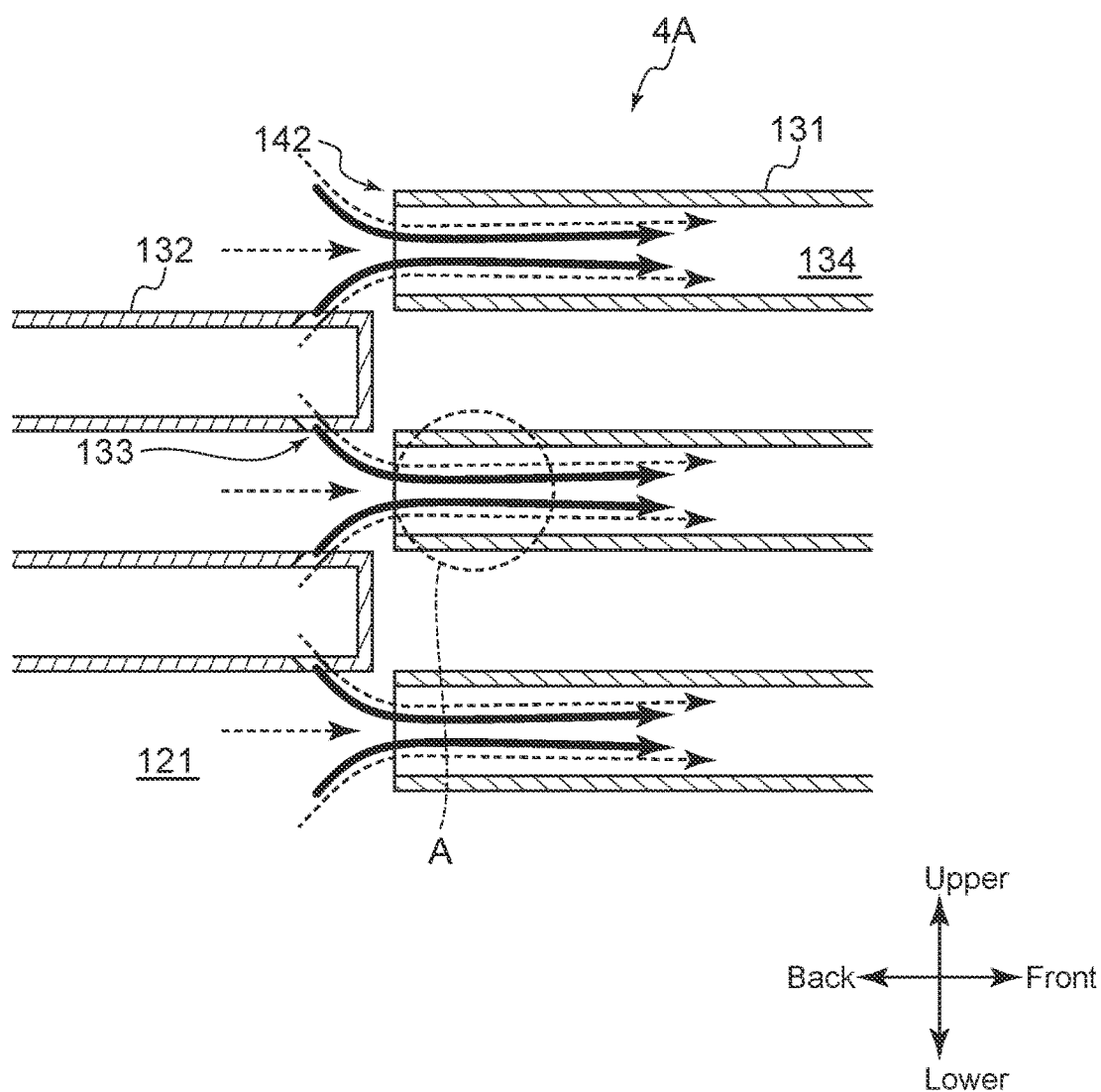
FIG. 9 is a diagram showing the flow of fuel and air entering inlets in the combustor according to the second embodiment of the present invention.

FIG. 9 is a diagram showing the flow of fuel and air entering the inlets 142 in the combustor 4A according to the second embodiment of the present invention. Also in the combustor 4A, the fuel nozzle 132 is disposed upstream of the inlet 142. However, the fuel nozzle 132 is arranged in the air chamber 121 so that at least a part (entirety in the example shown in FIG. 9) of the inlet 142 of the mixing passage forming member 131 is exposed to the air chamber 121. With this configuration, when the fuel is injected through the nozzle injection hole 133 of the fuel nozzle 132, the injected fuel can easily enter the inlet 142.

The injection of the fuel through the nozzle injection hole 133 of the fuel nozzle 132 is performed so as to be directed to the inlet 142 when viewed from upstream to downstream (i.e., from back side to front side) along the direction of the axis L (see FIG. 2) of the casing 20, as with the combustor 4. Thus, the fuel and the air enter the inlet 142 as described for the combustor 4. As a result, a contraction flow occurs in the portion A, which facilitates sufficient mixing of the fuel and the air in the mixing passage 134.

Particularly, in the example shown in FIG. 9, although omitted for convenience of illustration, since the first support plate 111 (see FIG. 2) is not provided, the air flow toward the inlet 142 is also formed on the fount side of the inlet 142. That is, the air flow passing through the gap between the mixing passage forming members 131 composed of the mixing tubes is formed. Thus, the air flows into the inlet 142 from more various directions than in the combustor 4. As a result, the contraction flow effect in the portion A is improved, so that it is possible to more sufficiently mix the fuel and the air in the mixing passage 134.

In the example shown in FIG. 9, a gap is formed between the front end surface of the fuel nozzle 132 and the inlet 142. However, the front end surface of the fuel nozzle 132 and the inlet 142 may be in contact. In this case, for instance, a groove capable of receiving a part of the open end of the inlet 142 may be provided on the front end surface of the fuel nozzle 132, and the part of the open end of the inlet 142 may be fitted into the groove (so-called mate fitting). Thus, it is possible to easily position the inlet 142 with respect to the fuel nozzle 132.

Additionally, in the combustor 4A, the length of the mixing passage forming member 131 in the front-back direction may be changed according to the mixing passage forming member 131. In other words, the lengths of the mixing passage forming members 131 in the front-back direction may be the same or different from each other. By changing the length of the mixing passage forming member 131 individually, the length of the mixing passage 134 can be changed individually. Thus, it is possible to damp combustion vibration of the combustor 4.

Figure 10:
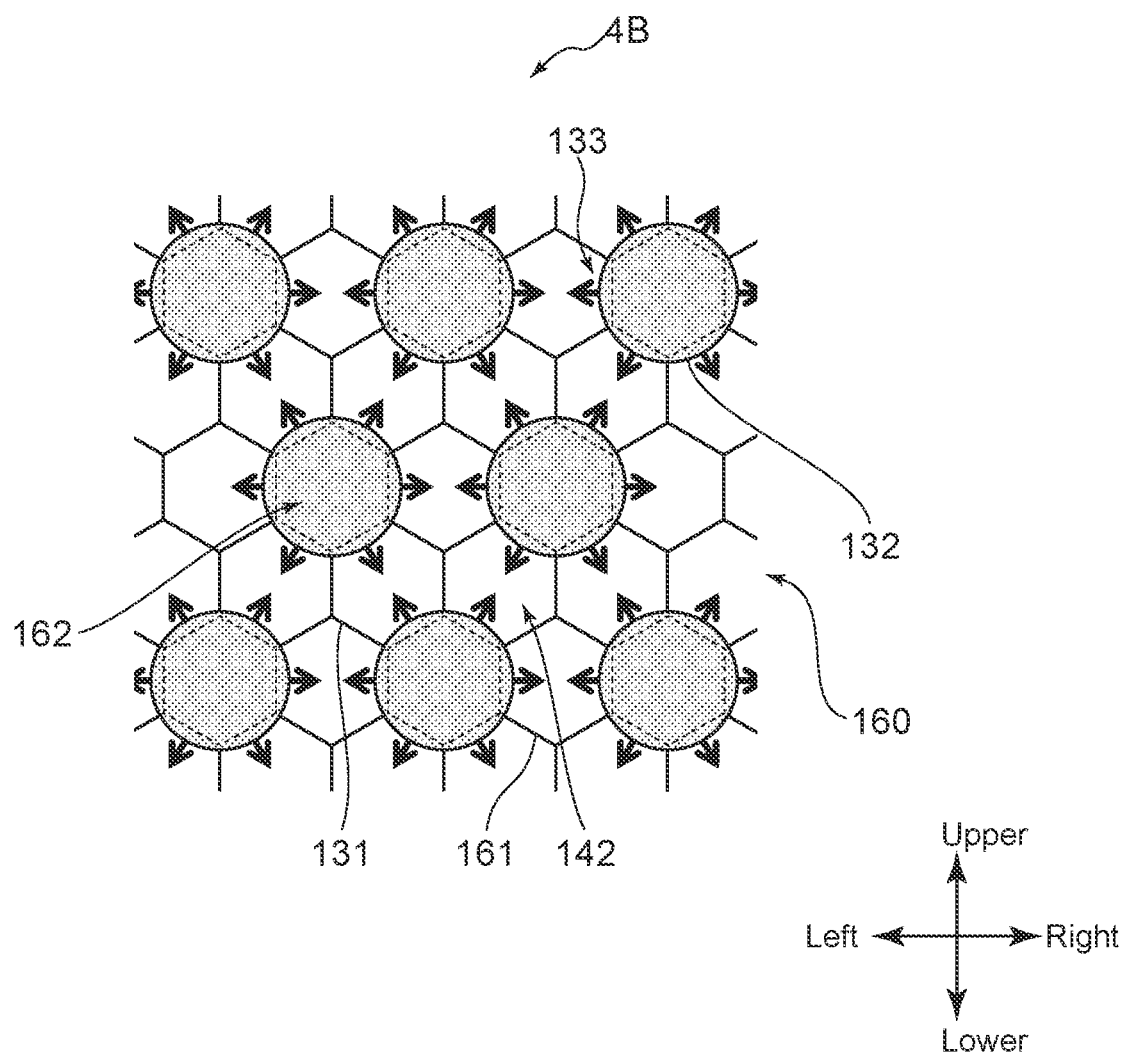
FIG. 10 is a diagram showing the arrangement of fuel nozzles and a partition wall assembly of a combustor according to a third embodiment of the present invention.

FIG. 10 is a diagram showing the arrangement of fuel nozzles 132 and a partition wall assembly 160 of a combustor 4B according to a third embodiment of the present invention. The partition wall assembly 160 can be used instead of the mixing tubes as the mixing passage forming member 131, and includes a plurality of mixing passages 134. Thus, one partition wall assembly 160 (an example of mixing passage forming member) includes a plurality of mixing passages 134. The partition wall assembly 160 is composed of an assembly of a plurality of partition walls 161 which separate the plurality of mixing passages 134.

The partition wall assembly 160 includes a plurality of mixing passages 134 formed in a regular hexagon shape when viewed from upstream to downstream (i.e., from back side to front side) along the direction of the axis L (see FIG. 2) of the casing 20. In other words, the partition wall assembly 160 is formed in a honeycomb shape. Further, when viewed as described above, the fuel nozzle 132 is arranged so as to be superposed on one opening portion 162. On the other hand, six nozzle injection holes 133 are formed in the fuel nozzle 132 at even intervals in the circumferential direction. Accordingly, the fuel is injected from the six nozzle injection holes 133 respectively to six inlets 142 located around the opening portion 162 on which the fuel nozzle 132 is superposed.

By providing the partition wall assembly 160 as the mixing passage forming member 131, when a failure occurs in the mixing passage 134, the failure can be eliminated by replacing the entire partition wall assembly 160, so that the maintenance is facilitated. Further, since the mixing passages 134 are separated by the partition wall 161, there is no wasted space, and the combustor 4B can be downsized. Further, since the mixing passages 134 are densely formed, the fuel can be supplied to many mixing passages 134 by one fuel nozzle 132. As a result, it is possible to reduce the number of fuel nozzles 132. Furthermore, it is possible to cause mixing close to a jet flow that receives a side wind, enabling particularly sufficient mixing.

Figure 11:
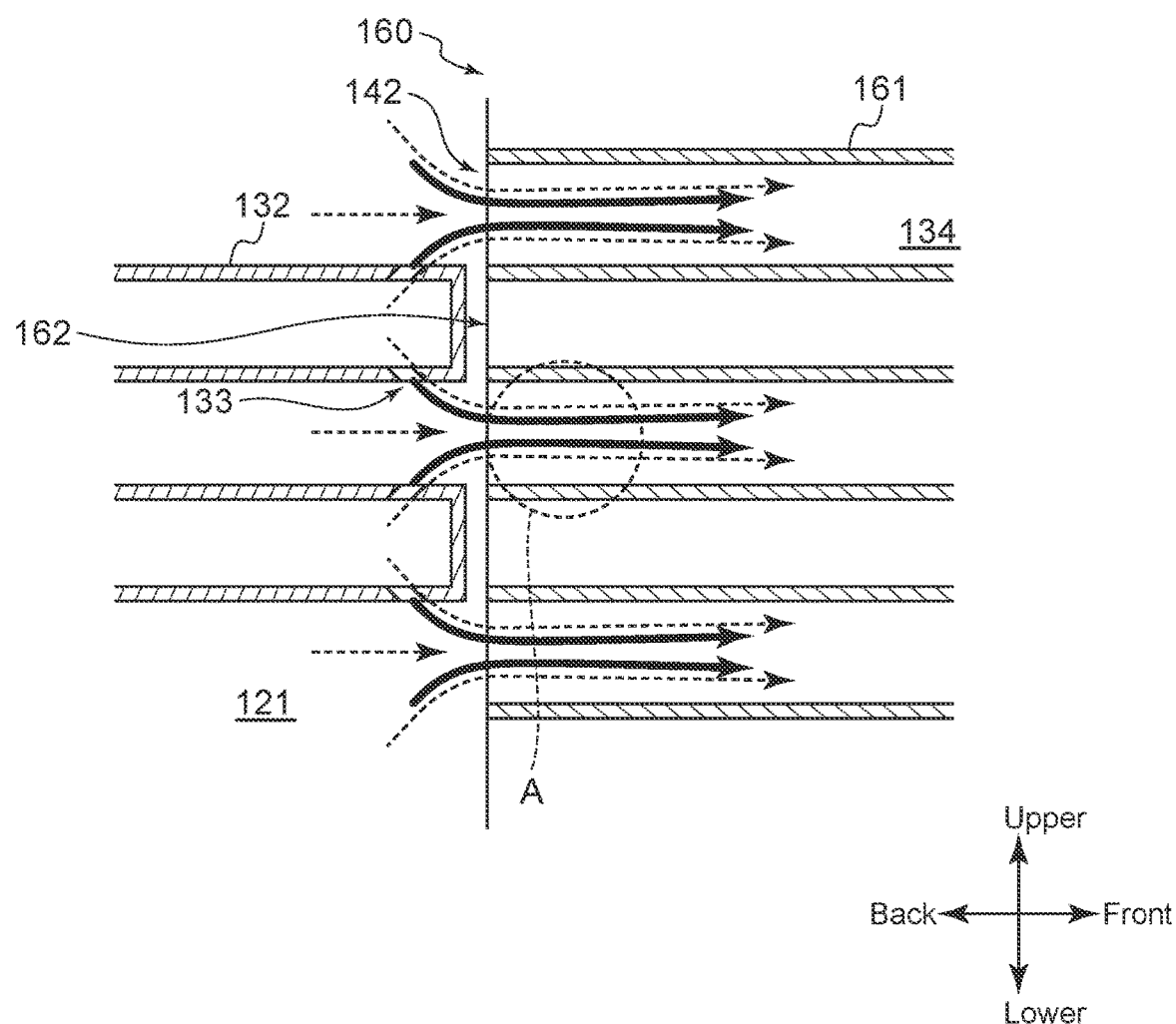
FIG. 11 is a diagram showing the flow of fuel and air entering inlets.

FIG. 11 is a diagram showing the flow of fuel and air entering the inlets 142. The injection of the fuel through the nozzle injection holes 133 of the plurality of fuel nozzles 132 is performed so as to be directed to the inlet 142 of the partition wall assembly 160 when viewed as described above. The fuel is directed to six inlets 142 (also see FIG. 10) located around the opening portion 162 on which the fuel nozzle 132 is superposed among the inlets 142 of the partition wall assembly 160. Thus, the fuel and the air enter the six inlets 142 as described for the combustor 4. As a result, a contraction flow occurs in the portion A, which facilitates sufficient mixing of the fuel and the air in the mixing passage 134.

Figure 12:
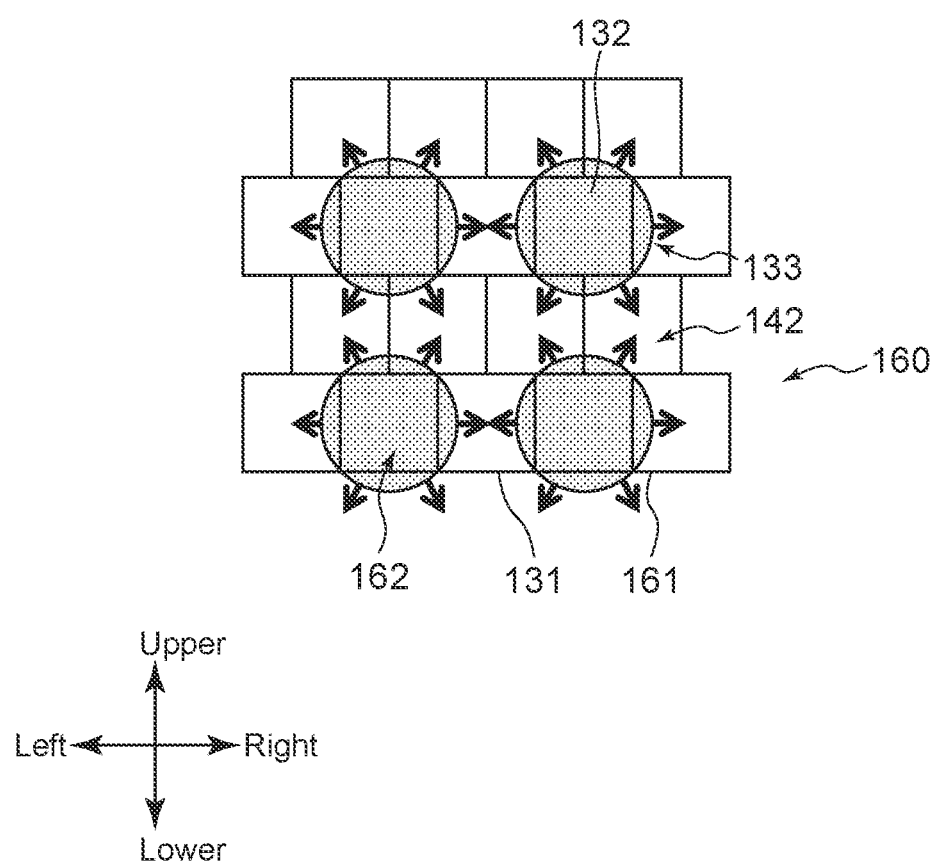
FIG. 12 is a diagram showing the arrangement of fuel nozzles and a partition wall assembly according to an embodiment different from FIG. 10.

FIG. 12 is a diagram showing the arrangement of the fuel nozzles 132 and the partition wall assembly 160 according to an embodiment different from FIG. 10. The partition wall assembly 160 shown in FIG. 12 is shaped in a staggered shape unlike the above-described partition wall assembly 160 of honeycomb shape. Further, as shown in FIG. 12, one fuel nozzle 132 is arranged so as to be superposed on one opening portion 162 although not depicted in detail. In the fuel nozzle 132, six nozzle injection holes 133 are formed at even intervals in the circumferential direction. Accordingly, the fuel is directed to the six inlets 142 located around the opening portion 162 on which the fuel nozzle 132 is superposed. Thus, the fuel and the air enter the six inlets 142 as described for the combustors 4, 4A, and 4B. As a result, a contraction flow occurs in the portion A (see FIG. 11), which facilitates sufficient mixing of the fuel and the air in the mixing passage 134.

Figure 13:
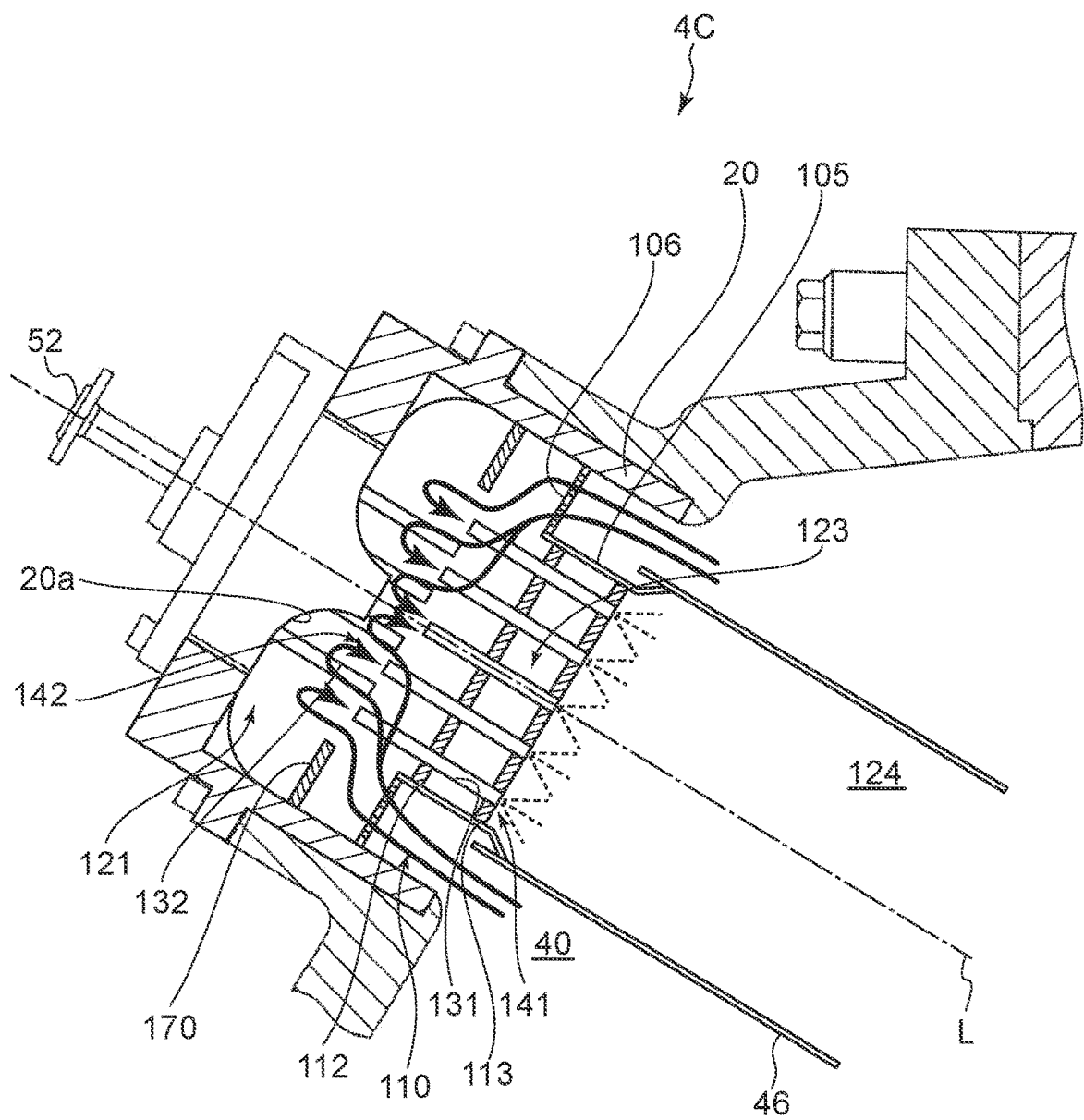
FIG. 13 is a cross-sectional view of the vicinity of a combustor according to a fourth embodiment of the present invention.
Figure 13:
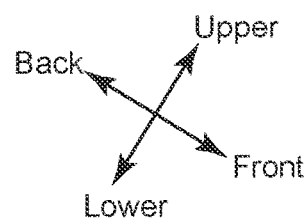

FIG. 13 is a cross-sectional view of the vicinity of a combustor 4C according to a fourth embodiment of the present invention. In the combustor 4C, the length of the cylindrical member 105 in the front-back direction is shorter than the length of the cylindrical member 105 of the combustor 4A (see FIG. 8). That is, in the combustor 4C, the back end of the cylindrical member 105 is substantially aligned with the installation position of the support member 106. Accordingly, as the air passage 110 formed between the cylindrical member 105 and the inner wall of the casing 20 is shortened, the air chamber 121 of the combustor 4C is extended as compared with the air chamber 121 formed in the combustor 4A.

Further, in the combustor 4C, between the back end of the cylindrical member 105 and the back-side inner wall 20a of the casing 20, a baffle 170 is disposed. The baffle 170 is supported by the inner wall surface of the casing 20 at a position where it impinges on the air flow in the air passage 110 (position that blocks the air flow).

The air introduced from the compartment 40 to the air passage 110 flows through the air passage 110 along the inner wall surface of the casing 20 and reaches the air chamber 121. At this time, since the baffle 170 is positioned so as to impinge on the air flow in the air chamber 121, the flow of the air that reaches the air chamber 121 is changed by the baffle 170. Specifically, as indicated by the solid arrow in FIG. 13, the air is spread over the entire air chamber 121 through the gap between the mixing passage forming members 131 arranged at intervals. In other words, the air flow in the air passage 110 impinges on the baffle 170, so that the air flow is disturbed, and the air from the air passage 110 is spread over the entire air chamber 121 through the gap between the mixing passage forming members 131.

With the above configuration, it is possible to easily adjust the length of the mixing passage forming member 131 in the radial direction of the cylindrical member 105 in accordance with the pressure loss until the air flowing out of the air passage 110 passes through the gap between the mixing passage forming members 131 and reaches the inlet 142. As a result, the amount of the air entering the inlet 142 can be easily equalized. Consequently, it is possible to easily equalize the amount of the air mixed in each mixing passage 134.

REFERENCE SIGNS LIST

2 Compressor
4, 4A, 4B, 4C Combustor
6 Turbine
8 Rotor
10 Compressor casing
12 Air inlet
14 Inlet guide vane
16, 24 Stator vane
18, 26 Rotor blade
20 Casing
20a Back-side inner wall
22 Turbine casing
28 Exhaust casing
30 Exhaust chamber
40 Compartment
52 Fuel port
100 Gas turbine
105 Cylindrical member
106 Support member
110 Air passage
111 First support plate
111a First opening
112 Second support plate
113 Third support plate
121 Air chamber
122 Fuel chamber
123 Cooling air chamber
124 Combustion chamber
131 Mixing passage forming member
132 Fuel nozzle
133 Nozzle injection hole (Fuel injection hole)
134 Mixing passage
141 Gas mixture injection hole
142 Inlet
160 Partition wall assembly
161 Partition wall
162 Opening portion
170 Baffle

The invention claimed is:

1. A combustor, comprising:
a casing having an air chamber filled with air inside the casing;
a plurality of mixing passage forming members defining a plurality of mixing passages, respectively, each of the plurality of mixing passages being connected at an inlet side to the air chamber and at an outlet side to a combustion chamber, and each of the plurality of mixing passage forming members having an inlet formed at the inlet side of a corresponding mixing passage of the plurality of mixing passages so as to communicate with the air chamber;
a plurality of fuel nozzles disposed inside the air chamber, each of the plurality of fuel nozzles having a fuel injection hole, positioned upstream of the inlet of a corresponding mixing passage forming member of the plurality of mixing passage forming members, for injecting fuel downstream; and a porous plate separating the air chamber from a fuel chamber, the porous plate having a first opening connecting the air chamber and the fuel chamber, and a second opening, forming the inlet of one of the plurality of mixing passages, connecting the air chamber and the one of the plurality of mixing passages, wherein:

the casing has the fuel chamber for storing the fuel inside the casing, the fuel chamber being formed between the air chamber and the combustion chamber;

a first fuel nozzle of the plurality of fuel nozzles is adjacent to a second fuel nozzle of the plurality of fuel nozzles;

the fuel injection hole of the first fuel nozzle and the fuel injection hole of the second fuel nozzle are directed to a common inlet of the inlets when viewed from upstream to downstream along an axial direction of the casing, one of the plurality of fuel nozzles has a bottomed cylindrical shape with a closed terminal end and an open terminal end;

the open terminal end of the one of the plurality of fuel nozzles is connected to the first opening of the porous plate; and the fuel is to flow from the fuel chamber to the one of the plurality of fuel nozzles via the open terminal end of the one of the plurality of fuel nozzles.

2. The combustor according to claim 1, wherein the fuel injection holes of the plurality of fuel nozzles are arranged at even intervals in a circumferential direction of the common inlet.

3. A gas turbine, comprising:

a combustor;

a compressor for compressing air to be supplied to the combustor; and a turbine configured to be driven by a combustion gas discharged from a combustion chamber of the combustor, wherein the combustor comprises:

a casing having an air chamber filled with the air inside the casing;

a plurality of mixing passage forming members defining a plurality of mixing passages, respectively, each of the plurality of mixing passages being connected at an inlet side to the air chamber and at an outlet side to the combustion chamber, and each of the plurality of mixing passage forming members having an inlet formed at the inlet side of a corresponding mixing passage of the plurality of mixing passages so as to communicate with the air chamber;

a plurality of fuel nozzles disposed inside the air chamber, each of the plurality of fuel nozzles having a fuel injection hole, positioned upstream of the inlet of a corresponding mixing passage forming member of the plurality of mixing passage forming members, for injecting fuel downstream; and a porous plate separating the air chamber from a fuel chamber, the porous plate having a first opening connecting the air chamber and the fuel chamber, and a second opening, forming the inlet of one of the plurality of mixing passages, connecting the air chamber and the one of the plurality of mixing passages, wherein:

the casing has the fuel chamber for storing the fuel inside the casing, the fuel chamber being formed between the air chamber and the combustion chamber;

a first fuel nozzle of the plurality of fuel nozzles is adjacent to a second fuel nozzle of the plurality of fuel nozzles;

the fuel injection hole of the first fuel nozzle and the fuel injection hole of the second fuel nozzle are directed to a common inlet of the inlets when viewed from upstream to downstream along an axial direction of the casing;

one of the plurality of fuel nozzles has a bottomed cylindrical shape with a closed terminal end and an open terminal end;

the open terminal end of the one of the plurality of fuel nozzles is connected to the first opening of the porous plate; and the fuel is to flow from the fuel chamber to the one of the plurality of fuel nozzles via the open terminal end of the one of the plurality of fuel nozzles.

* * * * *